US009505028B2

(12) United States Patent
Steiner et al.

(10) Patent No.: US 9,505,028 B2
(45) Date of Patent: Nov. 29, 2016

(54) PROTECTIVE COATING FOR LOW INDEX MATERIAL (71) Applicant: 3M INNOVATIVE PROPERTIES COMPANY, St. Paul, MN (US)

(72) Inventors: Michael L. Steiner, New Richmond, WI (US); William D. Coggio, Westford, MA (US); Thomas J. Ludemann, Maplewood, MN (US); Emilie L. Rexeisen, Mendota Heights, MN (US); William R. Dudley, Sebring, FL (US); Steven J. McMan, Stillwater, MN (US); Michael L. Ruegsegger, Mahtomedi, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/387,873

(22) PCT Filed: Mar. 19, 2013

(86) PCT No.: PCT/US2013/032887
§ 371 (c)(1),
(2) Date: Sep. 25, 2014

(87) PCT Pub. No.: WO2013/148407
PCT Pub. Date: Oct. 3, 2013

(65) Prior Publication Data
US 2015/0140316 A1 May 21, 2015

Related U.S. Application Data (60) Provisional application No. 61/617,842, filed on Mar. 30, 2012.

(51) Int. Cl.
| | |
|---|---|
| *B05D 1/26* | (2006.01) |
| *B05D 1/30* | (2006.01) |
| *B05D 5/06* | (2006.01) |
| *B05D 7/00* | (2006.01) |
| *G02B 1/10* | (2015.01) |
| *G02B 1/14* | (2015.01) |
| *G02B 5/02* | (2006.01) |

(52) U.S. Cl.
CPC . *B05D 5/06* (2013.01); *B05D 1/26* (2013.01); *B05D 1/305* (2013.01); *B05D 7/5423* (2013.01);
(Continued)

(58) Field of Classification Search
CPC .... B05D 1/26; B05D 1/305; B05D 2490/50; B05D 5/06; B05D 7/5423; B05D 7/5483; B05D 7/5823; B05D 7/5883; G02B 1/105; G02B 1/14; G02B 5/0242; G02B 5/0247
See application file for complete search history.

(56) References Cited

U.S. PATENT DOCUMENTS

| | | | |
|---|---|---|---|
| 2004/0229966 A1 * | 11/2004 | Dontula | B41M 5/52 521/50 |
| 2007/0153384 A1 | 7/2007 | Ouderkirk | |
| 2008/0128286 A1 * | 6/2008 | Wu | B82Y 20/00 205/95 |

FOREIGN PATENT DOCUMENTS

| | | |
|---|---|---|
| EP | 0972809 | 1/2000 |
| JP | 08283425 A * | 10/1996 |

(Continued)

OTHER PUBLICATIONS

Brunauer, "Adsorption of Gases in Multimolecular Layers", Journal American. Chemical Society, Feb. 1938, vol. 60, pp. 309-319.
(Continued)

Primary Examiner — James M Mellott
(74) Attorney, Agent, or Firm — Yen Tong Florezak (57) ABSTRACT The present disclosure describes a protective coating for a low index material, and a process for preparing a protected low index material. The protective coating partially penetrates the pores of a low index material, providing a seal protecting the pores, and can strengthen the construction by forming a gradient in properties of the protected low index material. The present disclosure further provides a diffusing low index optical element having a protected low index material and a diffusing layer disposed on the low index material.

11 Claims, 3 Drawing Sheets (52) U.S. Cl.
CPC ............. B05D 7/5823 (2013.01); G02B 1/105 (2013.01); G02B 1/14 (2015.01); G02B 5/0242 (2013.01); G02B 5/0247 (2013.01); B05D 7/5483 (2013.01); B05D 7/5883 (2013.01); B05D 2490/50 (2013.01); Y10T 428/249981 (2015.04); Y10T 428/249986 (2015.04)

(56) References Cited

FOREIGN PATENT DOCUMENTS

| JP | 0972809 A2 * | 1/2000 | ................ C08F 8/42 |
|----|---|---|---|
| WO | 2005-108294 | 11/2005 | |
| WO | 2010-120971 | 10/2010 | |
| WO | WO 2010120864 A1 * | 10/2010 | ........... G02B 5/0242 |
| WO | 2012-054680 | 4/2012 | |

OTHER PUBLICATIONS

Sudduth, "Modeling Cluster Voids and Pigment Distribution to Predict Properties and CPVC in coatings. Part 1: Dry Coating Analysis", Pigment and Resin Technology, 2008, vol. 37, No. 6, pp. 375-388.

Patton, Paint Flow and Pigment Dispersion, "Pigment/Binder Geometry", 2nd Edition, 126-160 (1978).

International Search Report for PCT International Application No. PCT/US2013/032887 mailed on Aug. 29, 2013, 4 pages.

* cited by examiner

PROTECTIVE COATING FOR LOW INDEX MATERIAL

CROSS REFERENCE TO RELATED APPLICATIONS

This application is a national stage filing under 35 U.S.C. 371 of PCT/US2013/032887, filed Mar. 19, 2013, which claims priority to U.S. Provisional Application No. 61/617,842, filed Mar. 30, 2012, the disclosure of which is incorporated by reference in its/their entirety herein.

BACKGROUND

Articles having a structure of nanometer sized pores or voids can be useful for several applications based on optical, physical, or mechanical properties provided by their nano-voided composition. For example, a nanovoided article includes a polymeric solid network or matrix that at least partially surrounds pores or voids. The pores or voids are often filled with gas such as air. The dimensions of the pores or voids in a nanovoided article can generally be described as having an average effective diameter that can range from about 1 nanometer to about 1000 nanometers. The International Union of Pure and Applied Chemistry (IUPAC) has defined three size categories of nanoporous materials: micropores with voids less than 2 nm, mesopores with voids between 2 nm and 50 nm, and macropores with voids greater than 50 nm. Each of the different size categories can provide unique properties to a nanovoided article.

SUMMARY

The present disclosure describes a protective coating for a low index material, and a process for preparing a protected low index material. The protective coating partially penetrates the pores of a low index material, providing a seal protecting the pores, and can strengthen the construction by forming a gradient in properties of the protected low index material. The present disclosure further provides a diffusing low index optical element having a protected low index material and a diffusing layer disposed on the low index material. In one aspect, the present disclosure provides a method that includes coating a first solution on a substrate, the first solution including a plurality of metal oxide particles, a binder, and a solvent, wherein the binder has a first concentration in the solvent; coating a second solution on the first solution, the second solution including the binder at a second concentration in the solvent, the second concentration different from the first concentration; and removing the solvent from the first solution and the second solution to form a protected film, wherein a weight ratio of the binder to the metal oxide particles increases in a thickness direction of the protected film.

In another aspect, the present disclosure provides a method that includes coating a first solution on a substrate, the first solution including a plurality of metal oxide particles, a binder, and a solvent, wherein the binder has a first concentration in the solvent; coating a second solution on the first solution, the second solution including the binder at a second concentration in the solvent, the second concentration different from the first concentration; and removing the solvent from the first solution and the second solution to form a protected film, wherein a weight ratio of the binder to the metal oxide particles increases in a thickness direction of the protected film. The method further includes coating a fourth solution on the protected film, the fourth solution having a second binder, and a second solvent, wherein the second binder has a fourth concentration in the second solvent; coating a fifth solution on the fourth solution, the fifth solution having a third binder at a fifth concentration in the second solvent and a plurality of diffuser particles; and removing the solvent from the fourth solution and the fifth solution to form a diffusing film.

In yet another aspect, the present disclosure provides an article that includes a substrate; a first layer disposed on a major surface of the substrate, the first layer including metal oxide particles dispersed in a binder, and a plurality of voids; a second layer disposed on the first layer, the second layer including metal oxide particles dispersed in the binder, absent a plurality of voids; and a protective layer disposed on the second layer, the protective layer including the binder, absent metal oxide particles and absent the plurality of voids.

In yet another aspect, the present disclosure provides an article that includes a substrate; a first layer disposed on a major surface of the substrate, the first layer including metal oxide particles dispersed in a binder, and a plurality of voids; a second layer disposed on the first layer, the second layer including metal oxide particles dispersed in the binder, absent a plurality of voids; and a protective layer disposed on the second layer, the protective layer including the binder, absent metal oxide particles and absent the plurality of voids. The article further includes a third layer disposed on the protective layer, the third layer having a second binder; and a fourth layer disposed on the third layer, the fourth layer having a plurality of diffuser particles and a third binder.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure provides a technique to seal and strengthen an low index fumed silica coating by controlled diffusion of a polymer into the low index layer. In one particular embodiment, a simultaneous coating of both layers can be used to effect the diffusion. In some cases, sequential coating of both layers can be used; however, the sequential coating preferably is done in rapid succession while both coating layers are still in solution. Using these techniques, protected films have been prepared that has not previously been physically possible.

Ultralow and low index coatings are preferably sealed to protect the air pores that provide the low-index properties from being compromised by adjacent layers or from the environment. Further, fumed silica based low index coatings can often be mated to another surface using a PSA (pressure sensitive adhesive). However, since low index coatings include an open cell porous network, a PSA can flow into the pores of the low index film when exposed to heat and humidity. Once the air inside the pores is displaced, the advantageous refractive index properties of the coating are lost. Similarly, if the low index coating is left open to the ambient environment, water or oils can fill the pores, also destroying the low index properties of the coating.

One technique of sealing these pores can involve using a material that either cannot flow into the low index pores, or is highly restricted from flowing very far into the low index pores. Examples of this technique can be found, for example, in co-pending U.S. Patent Application Ser. No. 61/405,015, entitled "Protected Low Refractive Index Optical Element". In some cases, either latex or a high molecular weight polymer has been used to accomplish this sealing. In some cases, the latex can be chosen such that the emulsion particles within the latex are too large to flow into the pores of the low index coating during coating. Additionally, the large size of the latex particles reduces any diffusion of the latex. After drying, the latex can coalesce into a contiguous film that can result in an abrupt index transition with little interpenetration of material between the two layers. Disadvantages of this technique can include low interlayer adhesion and surface haze (due to roughness) at the seal-fumed silica interface, and can also be prone to cracking upon drying the film.

In one aspect, the present disclosure provides a way to minimize surface haze at the low index seal interface and also to reduce film cracking due to drying stress. With careful control of interlayer diffusion, a sealed low index coating with a polymer gradient between the two layers can be readily achieved. The techniques described herein can require a multilayer coating process (or a sequential coating process of two fluid coatings) as both the low index and seal layers are preferably coated and dried simultaneously.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if a cell depicted in the figures is turned over or flipped over, portions previously described as below or beneath other elements would then be above those other elements.

As used herein, when an element, component or layer for example is described as forming a "coincident interface" with, or being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as begin "directly on," "directly connected to," "directly coupled with," or "directly in contact with" another element, there are no intervening elements, components or layers for example.

The present disclosure relates to optical elements that include a low refractive index layer and a polymeric protective layer. The polymeric protective layer is a stable protective layer that does not substantially degrade the physical properties the low refractive index layer upon aging. The polymeric protective layer comprises a binder that is also used in the low refractive index layer, and the binder forms a gradient from the low refractive index layer to the exterior surface of the polymeric protective layer. The present disclosure describes protective layers that can improve cohesive strength of a film construction having a low refractive index layer. While the present disclosure is not so limited, an appreciation of various aspects of the disclosure will be gained through a discussion of the examples provided below.

Some embodiments of diffuser coatings, articles or constructions of the present disclosure include one or more low refractive index layers that include a plurality of voids dispersed in a binder. The voids have an index of refraction $n_v$ and a permittivity $\in_v$, where $n_v^2 = \in_v$, and the binder has an index of refraction $n_b$ and a permittivity $\in_b$, where $n_b^2 = \in_b$. In general, the interaction of a low refractive index layer with light, such as light that is incident on, or propagates in, the low refractive index layer, depends on a number of film or layer characteristics such as, for example, the film or layer thickness, the binder index, the void or pore index, the pore shape and size, the spatial distribution of the pores, and the wavelength of light. In some embodiments, light that is incident on or propagates within the low refractive index layer "sees" or "experiences" an effective permittivity $\in_{eff}$ and an effective index $n_{eff}$, where $n_{eff}$ can be expressed in terms of the void index $n_v$, the binder index $n_b$, and the void porosity or volume fraction "f." In such embodiments, the optical film or low refractive index layer is sufficiently thick and the voids are sufficiently small so that light cannot resolve the shape and features of a single or isolated void. In such embodiments, the size of at least a majority of the voids, such as at least 60% or 70% or 80% or 90% of the voids, is not greater than about $\lambda/5$, or not greater than about $\lambda/6$, or not greater than about $\lambda/8$, or not greater than about λ/10, or not greater than about λ/20, where λ is the wavelength of light. In some embodiments, some of the voids can be sufficiently small so that their primary optical effect is to reduce the effective index, while some other voids can reduce the effective index and scatter light, while still some other voids can be sufficiently large so that their primary optical effect is to scatter light.

In some embodiments, the light that is incident on a low refractive index layer is visible light, meaning that the wavelength of the light is in the visible range of the electromagnetic spectrum. In these embodiments, the visible light has a wavelength that is in a range of from about 380 nm to about 750 nm, or from about 400 nm to about 700 nm, or from about 420 nm to about 680 nm. In these embodiments, the low refractive index layer has an effective index of refraction and includes a plurality of voids if the size of at least a majority of the voids, such as at least 60% or 70% or 80% or 90% of the voids, is not greater than about 70 nm, or not greater than about 60 nm, or not greater than about 50 nm, or not greater than about 40 nm, or not greater than about 30 nm, or not greater than about 20 nm, or not greater than about 10 nm.

In some embodiments, the low refractive index layer is sufficiently thick so that the low refractive index layer has an effective index that can be expressed in terms of the indices of refraction of the voids and the binder, and the void or pore volume fraction or porosity. In such embodiments, the thickness of the low refractive index layer is not less than about 1 micrometer, or not less than about 2 micrometers, or in a range from 1 to 20 micrometers.

When the voids in a disclosed low refractive index layer are sufficiently small and the low refractive index layer is sufficiently thick, the low refractive index layer has an effective permittivity $\epsilon_{\mathit{eff}}$ that can be expressed as: $\epsilon_{\mathit{eff}} = f\epsilon_v + (1-f)\epsilon_b$ In these embodiments, the effective index $n_{\mathit{eff}}$ of the optical film or low refractive index layer can be expressed as: $n_{\mathit{eff}}^2 = fn_v^2 + (1-f)n_b^2$ In some embodiments, such as when the difference between the indices of refraction of the pores and the binder is sufficiently small, the effective index of the low refractive index layer can be approximated by the following expression: $n_{\mathit{eff}} = fn_v + (1-f)n_b$ In these embodiments, the effective index of the low refractive index layer is the volume weighted average of the indices of refraction of the voids and the binder. Under ambient conditions, the voids contain air, and thus the refractive index $n_v$ for the voids is approximately 1.00. For example, a low refractive index layer that has a void volume fraction of about 50% and a binder that has an index of refraction of about 1.5 has an effective index of about 1.25.

In some embodiments, the effective index of refraction of the low refractive index layer is not greater than (or is less than) about 1.3, or less than about 1.25, or less than about 1.2, or less than about 1.15, or less than about 1.1. In some embodiments, the refractive index is between about 1.14 and about 1.30. In some embodiments, the low refractive index layer includes a binder, a plurality of particles, and a plurality of interconnected voids or a network of interconnected voids. In other embodiments, the low refractive index layer includes a binder and a plurality of interconnected voids or a network of interconnected voids.

A plurality of interconnected voids or a network of interconnected voids can occur in a number of methods. In one process, the inherent porosity of highly structured, high surface area fumed metal oxides, such as fumed silica oxides, is exploited in a mixture of binder to form a composite structure that combines binder, particles, voids and optionally crosslinkers or other adjuvant materials. The desirable binder to particle ratio is dependent upon the type of process used to form the interconnected voided structure.

While a binder resin is not a prerequisite for the porous fumed silica structure to form, it is typically desirable to incorporate some type of polymeric resin or binder in with the metal oxide network to improve the processing, coating quality, adhesion and durability of the final construction. Examples of useful binder resins are those derived from thermosetting, thermoplastic and UV curable polymers. Examples include polyvinylalcohol, (PVA), polyvinylbutyral (PVB), polyvinyl pyrrolidone (PVP), polyethylene vinyl acetate copolymers (EVA), cellulose acetate butyrate (CAB) polyurethanes (PURs), polymethylmethacrylate (PMMA), polyethylene oxide, polypropylene oxide, polyacrylates, epoxies, silicones and fluoropolymers, or a combination thereof. The binders could be soluble in an appropriate solvent such as water, ethyl acetate, acetone, 2-butone, isopropyl alcohol, methyl ethyl ketone, and the like, or they could be used as dispersions or emulsions. Examples of some commercially available binders useful in the mixtures are those available from Kuraray-USA, Wacker Chemical, Dyneon LLC, and Rhom and Haas. Although the binder can be a polymeric system, it can also be added as a polymerizable monomeric system, such as a UV, or thermally curable or crosslinkable system. Examples of such systems would be UV polymerizable acrylates, methacrylates, multifunctional acrylates, urethane-acrylates, and mixtures thereof. Some typical examples would be 1,6 hexane diol diacrylate, trimethylol propane triacrylate, pentaerythritol triacryalate. Such systems are readily available from suppliers such as Neo Res (Newark, Del.), Arkema (Philadelphia, Pa.), or Sartomer (Exton, Pa.). Actinic radiation such as electron beam (E-beam), gamma and UV radiation are useful methods to initiate the polymerization of these systems, with many embodiments utilizing UV active systems. Other useful binder systems can also be cationically polymerized, such systems are available as vinyl ethers and epoxides.

The polymeric binders can also be formulated with cross linkers that can chemically bond with the polymeric binder to form a crosslinked network. Although the formation of crosslinks is not a prerequisite for the formation of the porous structure or the low refractive index optical properties, it is often desirable for other functional reasons such as to improve the cohesive strength of the coating, adhesion to the substrate or moisture, or thermal and solvent resistance. The specific type of crosslinker is dependent upon the binder used. Typical crosslinkers for polymeric binders such as PVA would be diisocyanates, titanates such as TYZOR-LA™ (available from DuPont, Wilmington, Del.), poly (epichlorhydrin)amide adducts such as PolyCup 172, (available from Hercules, Wilmington, Del.), multi-functional aziridines such as CX100 (available from Neo-Res, Newark, Del.) and boric acid, diepoxides, diacids and the like.

The polymeric binders may form a separate phase with the particle aggregates or may be inter-dispersed between the particle aggregates in a manner to "bind" the aggregates together into a structures that connect with the metal oxide particles through direct covalent bond formation or molecular interactions such as ionic, dipole, van Der Waals forces, hydrogen bonding and physical entanglements with the metal oxides.

Exemplary particles include fumed metal oxides or pyrogenic metal oxides, such as, for example, a fumed silica or alumina. In some embodiments, particles that are highly branched or structured may be used. Such particles prevent efficient packing in the binder matrix and allow interstitial voids or pores to form. Exemplary materials include highly branched or structured particles include Cabo-Sil™ fumed silicas or silica dispersions, such as, for example, those sold under trade designations EH5, TS 520, or pre-dispersed fumed silica particles such as those available as Cabo-Sperse™ PG 001, PG 002, PG 022, 1020K, 4012K, 1015 (available form Cabot Corporation). Fumed alumina oxides are also useful structured particles to form a low refractive index system although silica may be preferred since it has an inherently lower skeletal refractive index than alumina. Examples of alumina oxide are available under the trade name Cabo-Sperse, such as, for example, those sold under the trade designation Cabo-Sperse™ PG003 or Cabot Spec-A1™. In some embodiments, aggregates of these exemplary fumed metal oxides include a plurality of primary particles in the range of about 8 nm to about 20 nm and form a highly branched structure with a wide distribution of sizes ranging from about 80 nm to greater than 300 nm. In some embodiments, these aggregates pack randomly in a unit volume of a coating to form a mesoporous structure with complex bi-continuous network of channels, tunnels, and pores which entrap air in the network and thus lower the density and refractive index of the coating. Other useful porous materials are derived from naturally occurring inorganic materials such as clays, barium sulfates, alumina, silicates and the like.

Fumed silica particles can also be treated with a surface treatment agent. Surface treatment of the metal oxide particles can provide, for example, improved dispersion in the polymeric binder, altered surface properties, enhanced particle-binder interactions, and/or reactivity. In some embodiments, the surface treatment stabilizes the particles so that the particles are well dispersed in the binder, resulting in a substantially more homogeneous composition. The incorporation of surface modified inorganic particles can be tailored, for example, to enhance covalent bonding of the particles to the binder, thereby providing a more durable and more homogeneous polymer/particle network.

The preferred type of treatment agent is determined, in part, by the chemical nature of the metal oxide surface. Silanes are preferred for silica and other for siliceous fillers. In the case of silanes, it may be preferred to react the silanes with the particle surface before incorporation into the binder. The required amount of surface modifier is dependent upon several factors such as, for example, particle size, particle type, modifier molecular weight, and/or modifier type. The silane modifier can have reactive groups that form covalent bonds between particles and the binder, such as, for example, carboxy, alcohol, isocynanate, acryloxy, epoxy, thiol or amines. Conversely, the silane modifier can have non-reactive groups, such as, for example, alkyl, alkloxy, phenyl, phenyloxy, polyethers, or mixtures thereof. Such non-reactive groups may modify the surface of the coatings to improve, for example, soil and dirt resistance or to improve static dissipation. Commercially available examples of a surface modified silica particle include, for example, Cabo-Sil™ TS 720 and TS 530. It may sometimes be desirable to incorporate a mixture of functional and non-function groups on the surface of the particles to obtain a combination of these desirable features.

Representative embodiments of surface treatment agents suitable for use in the compositions of the present disclosure include, for example, N-(3-triethoxysilylpropyl) methoxyethoxyethyl carbamate, N-(3-triethoxysilylpropyl) methoxyethoxyethoxyethyl carbamate, 3-(methacryloyloxy) propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl) methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxyl) ethoxy]acetic acid (MEEAA), beta-carboxyethylacrylate (BCEA), 2-(2-methoxyethoxyl)acetic acid, methoxyphenyl acetic acid, and mixtures thereof.

Particle volume concentration (PVC) and critical particle volume concentration (CPVC) can be used to characterize the porosity of the particle binder system used to make the coating. The terms PVC and CPVC are well defined terms in the paint and pigment literature and are further defined in frequently referenced articles and technical books, such as, for example *Paint Flow and Pigment Dispersion*, Patton, T. C., $2^{nd}$ Edition, J. Wiley Interscience, 1978, Chapter 5, p. 126 and *Modeling Cluster Voids and Pigment Distribution to Predict Properties and CPVC in Coatings. Part 1: Dry Coating Analysis* and Sudduth, R. D; *Pigment and Resin Technology*, 2008, 37(6). p. 375.

When the volume concentration of the particles is larger than CPVC, the coating is porous since there is not enough binder to fill all the gaps between the particles and the interstitial regions of the coating. The coating then becomes a mixture of binder, particles, and voids. The volume concentration at which this occurs is related to particle size and particle structure wetting and/or shape. Formulations with volume concentrations above CPVC have a volume deficiency of resin in the mixture that is replaced by air. The relationship between CPVC, PVC and porosity is: porosity=CPVC/PVC.

As used in this discussion of CPVC, the term "pigment" is equivalent to particles and the term "resin" is equivalent to binder. In certain binder-particle systems, when the volume concentration of the particles exceeds a critical value known, as the CPVC, the mixture becomes porous. Thus the coating becomes essentially a mixture of binder, particles, and air, because there is insufficient binder to fill all the gaps between the particles and the interstitial regions of the coating. When this occurs, the volume concentration is related to at least one of the pigment particle size distribution, wetting, and the particle structure or shape. Materials that provide desired low refractive index properties have submicron pores derived from particle-binder mixtures that are highly structured and formulated above their CPVC. In some embodiments, optical articles have CPVC values that are not greater than (or are less than) about 60%, or less than about 50%, or less than about 40%.

As described above, particles that are highly branched or structured prevent efficient packing in the binder matrix and allow interstitial voids or pores to form. In contrast, material combinations which fall below the desired CPVC will not be sufficiently porous. The BET method (described herein) may be helpful in determining CPVC and thus porosity of low index materials because the BET method analyzes pores that are less than 200 nm in diameter, less than 100 nm in diameter, or even less than 10 nm in diameter. As used herein, the term "BET method" refers to the Braunauer, Emmett, and Teller surface area analysis (See S. Brunauer, P. H. Emmett and E. Teller, *J. Am. Chem. Soc.*, 1938, 60, 309). The BET method is a well-known, scientifically validated method used to determine pore size, surface area, and percent porosity of a solid substance. BET theory relates to the physical adsorption of gas molecules on a solid surface and serves as the basis for obtaining physical information about the surface area and porosity of a solid surface. BET data can assist in the characterization of materials that meet minimum requirements for forming a porous structure.

The volume concentration of the particles described by the PVC/CPVC relationship is also related to the weight concentration of the particles. It is therefore, possible to establish particle weight ranges that are above the CPVC. The use of weight ratio or weight percent is one way to formulate mixtures with the desirable CPVC values. For the optical constructions of the present disclosure, weight ratios of binder to particle from 1:1 to 1:8 are desirable. A weight ratio of 1:1 is the equivalent of about 50 wt % particle, whereas 1:8 is equivalent to about 89 wt % particle. Exemplary binder to metal oxide particle ratios are less than 1:2 (less than 33% binder), less than 1:3, less than 1:4, less than 1:5, less than 1:6, less than 1:7, less than 1:8, less than 1:9, and less than 1:10 (about 8-10% binder). The upper limit of binder may be dictated by the desired refractive index. The lower limit of binder may be dictated by the desired physical properties, for example, processing or final durability characteristics. Thus the binder to particle ratio will vary depending on the desired end use and the desired optical article properties.

In general, the low refractive index layer can have any porosity, pore size distribution, or void volume fraction that may be desirable in an application. In some embodiments, the volume fraction of the plurality of the voids in the low refractive index layer is not less than about 20%, or not less than about 30%, or not less than about 40%, or not less than about 50%, or not less than about 60%, or not less than about 70%, or not less than about 80%.

In some embodiments, portions of the low refractive index layer can manifest some low index properties, even if the low refractive index layer has a high optical haze and/or diffuse reflectance. For example, in such embodiments, the portions of the low refractive index layer can support optical gain at angles that correspond to an index that is smaller than the index $n_b$ of the binder.

In some embodiments, some of the particles have reactive groups and others do not have reactive groups. For example in some embodiments, about 10% of the particles have reactive groups and about 90% of the particles do not have reactive groups, or about 15% of the particles have reactive groups and about 85% of the particles do not have reactive groups, or about 20% of the particles have reactive groups and about 80% of the particles do not have reactive groups, or about 25% of the particles have reactive groups and about 75% of the particles do not have reactive groups, or about 30% of the particles have reactive groups and about 60% of the particles do not have reactive groups, or about 35% of the particles have reactive groups and about 65% of the particles do not have reactive groups, or about 40% of the particles have reactive groups and about 60% of the particles do not have reactive groups, or about 45% of the particles have reactive groups and about 55% of the particles do not have reactive groups, or about 50% of the particles have reactive groups and about 50% of the particles do not have reactive groups. In some embodiments, some of the particles may be functionalized with both reactive and unreactive groups on the same particle.

The ensemble of particles may include a mixture of sizes, reactive and non-reactive particles and different types of particles, for example, organic particles including polymeric particles such as acrylics, polycarbonates, polystyrenes, silicones and the like; or inorganic particles such as glasses or ceramics including, for example, silica and zirconium oxide, and the like.

In some embodiments, the low refractive index layers or material has a BET porosity that is greater than about 30% (which corresponds to a surface area of about 50 m²/g as determined by the BET method), porosity greater than about 50% (which corresponds to a surface area of about 65-70 m²/g as determined by the BET method), greater than about 60% (which corresponds to a surface area of about 80-90 m²/g as determined by the BET method), and most preferably between about 65% and about 80% (which corresponds to a somewhat higher surface area of values greater than about 100 m²/g as determined by the BET method). In some embodiments, the volume fraction of the plurality of interconnected voids in the low refractive index layer is not less than (or is greater than) about 20%, or greater than about 30%, or greater than about 40%, or greater than about 50%, or greater than about 60%, or greater than about 70%, or greater than about 90%. Generally it can be shown higher surface areas indicated higher percent porosity and thus lower refractive index, however, the relationship between these parameters is complicated. The values shown here are only for purposes of guidance and not meant to exemplify a limiting correlation between these properties. The BET surface area and percent porosity values will be dictated by the need to balance the low refractive index and other critical performance properties such as cohesive strength of the coating.

The optical constructions of the present disclosure can have any desired optical haze. In some embodiments, low refractive index layer has an optical haze that is not less than (or is greater than) about 20%, or greater than about 30%, or greater than about 40%, or greater than about 50%, or greater than about 60%, or greater than about 70%, or greater than about 80%, or greater than about 90%, or greater than about 95%. In some embodiments, the low index refractive layer has a low optical haze. For example, in some embodiments, the optical haze of the low index refractive layer is less than about 20%, less than about 10%, less than about 5%, less than about 3%, less than about 2%, less than about 1.5%, or less than about 1%.

In some embodiments, portions of neighboring major surfaces of each two neighboring layers in optical construction are in physical contact with each other. For example, portions of neighboring major surfaces of respective neighboring layers in optical construction are in physical contact with each other. For example, at least 30%, or at least 40%, or at least 50%, or at least 60%, or at least 70%, or at least 80%, or at least 90%, or at least 95% of the two neighboring major surfaces are in physical contact with each other.

In some embodiments, portions of neighboring major surfaces (major surfaces that face each other or are adjacent to each other) of each two neighboring layers in optical construction are in physical contact with each other. For example, in some embodiments, there may be one or more additional layers, not expressly shown in the figures, disposed between the low refractive index layer and optical elements. In such embodiments, substantial portions of neighboring major surfaces of each two neighboring layers in optical constructions are in physical contact with each other. In such embodiments, at least 30%, or at least 40%, or at least 50%, or at least 60%, or at least 70%, or at least 80%, or at least 90%, or at least 95% of the neighboring major surfaces of each two neighboring layers in the optical construction are in physical contact with each other.

There are numerous coating techniques known in the art useful to make the embodiments of this invention. The more common techniques are, but not limited to, well known roll-to-roll automated processes such as knife bar, slot die, slide, curtain, roll and gravure coating techniques. It is also possible to coat these solutions using non-continuous methods such as inkjet, screen, offset printing, dip and spray coating techniques. While the exact coating technique is not critical to obtain the low refractive index properties some techniques enable multiple layers to be coated onto the substrate simultaneously, which can enable the formation of a coating which can be used to directly form the desired protective coating on the low refractive index coating. Exemplary simultaneous coating techniques include slide coating, multilayer slot coating, curtain coating, and the like.

Figure 1:
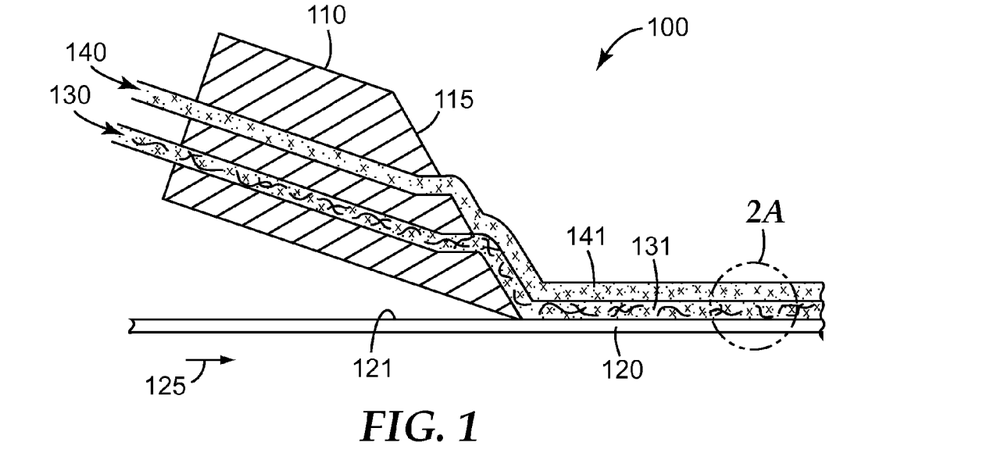
FIG. 1 shows a schematic of slide coating two layers on a substrate.

FIG. 1 shows a schematic of slide coating two layers on a substrate, according to one aspect of the disclosure. In FIG. 1, a first solution 130 and a second solution 140 are pumped through a slide coating die 110 and exit onto a slide surface 115 as first coating layer 131 and second coating layer 141. A substrate 120 having a major surface 121 is moving at a speed 125 past the slide coating die 110, and the first and second coating layers 131, 141 are deposited onto the major surface 121 simultaneously.

Figure 2A:
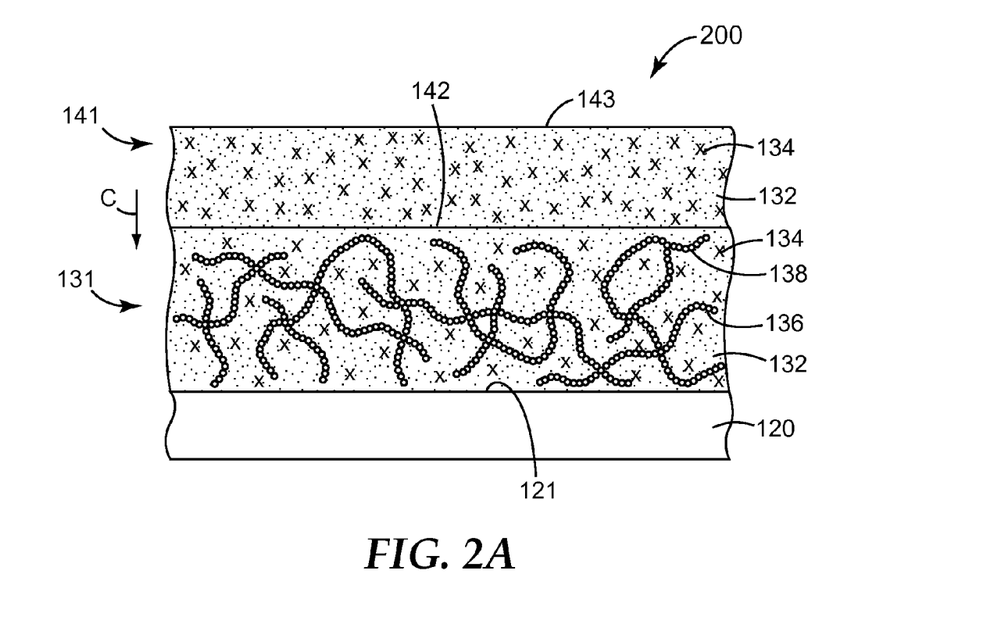
FIG. 2A shows a cross-sectional schematic of a portion of the coating in FIG. 1.

Substrate 120 can be any useful optical element. In many embodiments the substrate 120 is a polarizing film, a diffusing film, a reflecting film, a retarder, a light guide or a liquid crystal display panel, or a combination thereof. In some embodiments, the reflecting film can be a multilayer dielectric film such as an Enhanced Specular Reflective (ESR) film available from 3M Company, St. Paul, Minn. In some embodiments the substrate 120 is a visible light transparent substrate, such as known in the art. In some embodiments, the substrate 120 can be an absorbing polarizer or a reflective polarizer. Reflective polarizers include fiber, multilayer, cholesteric, and wire grid reflective polarizers, for example. Multilayer reflective polarizers include Brightness Enhancement Film (BEF) and Dual Brightness Enhancement Film (DBEF) both commercially available from 3M Company, St. Paul, Minn. In some embodiments, the substrate 120 can be a light redirecting film and being diffractive and/or refractive. In some embodiments, the substrate 120 can be a graphic film, triacetate cellulose, or an optical adhesive. FIG. 2A shows a cross-sectional schematic of a portion 200 of the coating in FIG. 1, according to one aspect of the disclosure. In FIG. 2A, first coating layer 131 is disposed directly on major surface 121 of substrate 120, and second coating layer 141 is disposed directly on first coating layer 131, with an interface layer 142 between them. First coating layer 131 includes a plurality of metal oxide particles 138, a binder 134, and a solvent 132, where the binder 134 has a first concentration in the solvent 132. In some cases, the plurality of metal oxide particles 138 may be agglomerated into chains 136 that include metal oxide particles 138 dispersed in the binder 134. The ratio of the binder 134 to metal oxide particles 138 can be any of the ranges described previously; however, a weight ratio of binder 134 to metal oxide particles 138 ranging from about 1:3 to about 1:7 can be preferred, and a weight ratio from about 1:4 to 1:6 can be especially preferred.

Second coating layer 141 includes the binder 134 dispersed in the solvent 132 at a second concentration, and the second concentration is different from the first concentration, generating a concentration gradient "C" across the interface layer 142. In some cases, the binder 134 can be identical in each of the first and second coating layers 131, 141. In some cases, there can be a difference in the average molecular weight of the binder 134 between the first and second coating layers 131, 141, for example, a higher molecular weight binder 134 can be used in the second coating layer 141 than in the first coating layer 131.

The binder 134 can be any of the binders described previously; however polyvinyl alcohol (PVA), polyvinyl butyral (PVB), polyvinyl pyrrolidone, polyvinyl acetate, vinyl acetate/ethylene copolymers, polyethylene oxide, polypropylene oxide, or a combination thereof, can be preferred binders. In some embodiments, the binder 134 can be formed from polymers having an average molecular weight of about 40,000 g/mol. In some embodiments, the binder 134 can be formed from polymers having an average molecular weight of at least 100,000 g/mol, or at least 250,000 g/mol, or at least 500,000 g/mol. In one particular embodiment, PVA can be a preferred binder, and higher molecular weight PVA having a molecular weight greater than about 5,000, or greater than about 10,000, or greater than about 20,000, or even greater than about 30,000, can be especially preferred. The solvent 132 can be any of the solvents described previously; however, water, isopropyl alcohol, methyl ethyl ketone, or a combination thereof can be preferred.

Figure 2B:
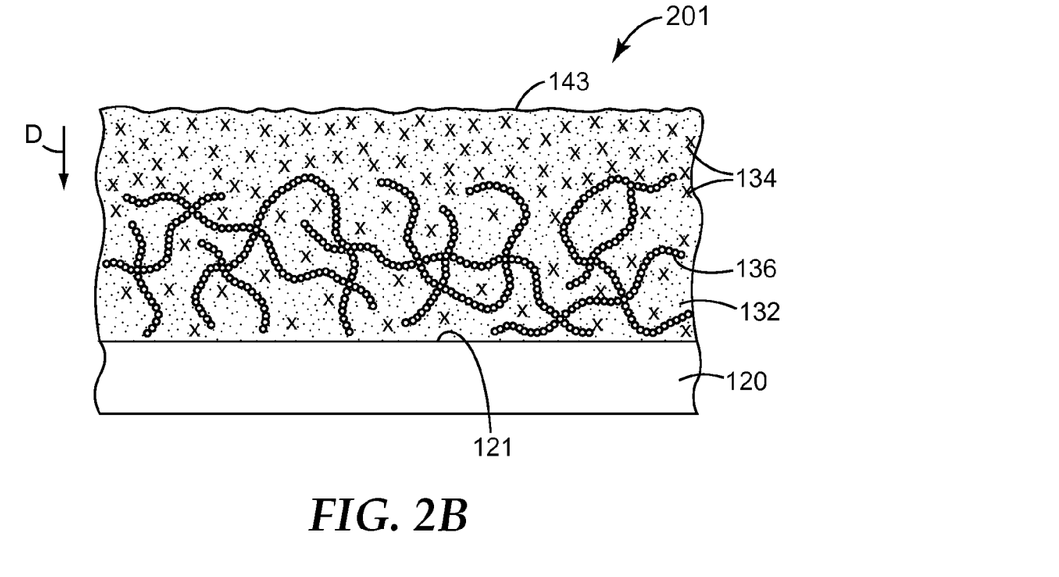
FIG. 2B shows a cross-sectional schematic of FIG. 2A during a drying process.

FIG. 2B shows a cross-sectional schematic of FIG. 2A during a drying process, according to one aspect of the disclosure. In FIG. 2B, the drying coating portion 201 shows that the binder 134 has diffused in a direction "D" from the second coating layer 141 to the first coating layer 131, as the solvent 132 is driven from the coating, so that a higher concentration of binder 134 is interspersed throughout the metal oxide particles 138.

Figure 2C:
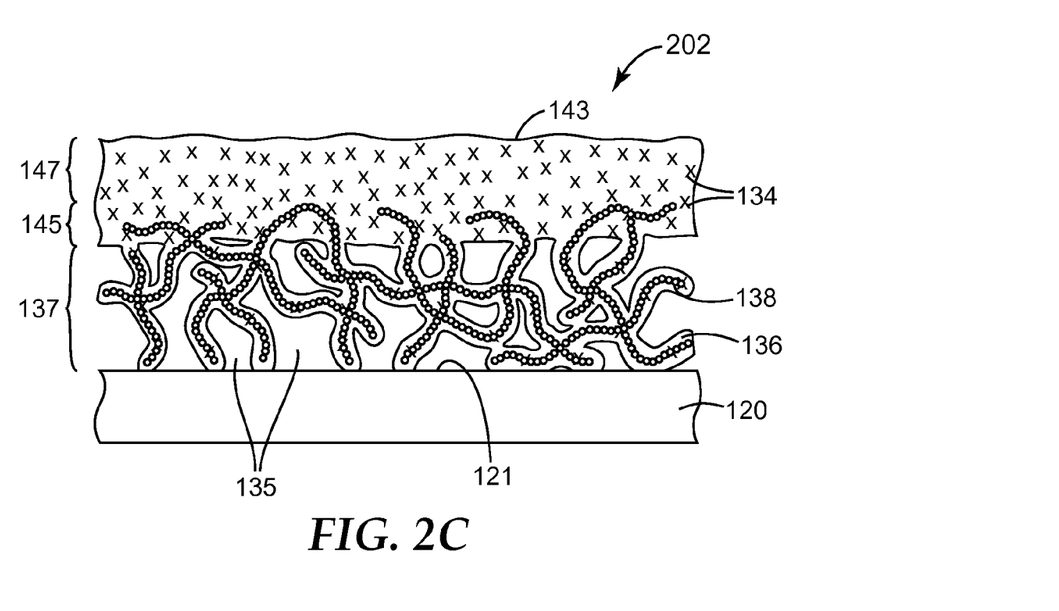
FIG. 2C shows a cross-sectional schematic of a protected film.

FIG. 2C shows a cross-sectional schematic of a protected film 202, according to one aspect of the disclosure. Protected film 202 comprises a substrate 120 having a first layer 137 disposed on a major surface 121 of the substrate 120, the first layer 137 comprising metal oxide particles 138 dispersed in a binder 134, and a plurality of voids 135. Protected film 202 further comprises a second layer 145 disposed on the first layer 137, the second layer 145 comprising metal oxide particles 138 dispersed in the binder 134, absent a plurality of voids 135. The protected film further includes a protective layer 147 disposed on the second layer 145, the protective layer 147 comprising the binder 134, absent metal oxide particles 138 and absent the plurality of voids 135.

The protective layer 147, the second layer 145, and the first layer 137 can have any useful thickness. The first layer 137 can be a low refractive index layer as described elsewhere, and can have a thickness ranging from about 1 to about 30 microns, or from about 1 to about 20 microns, or from about 5 to about 20 microns, or from about 10 to about 15 microns, or from about 10 to about 12 microns. The protective layer 147 and the second layer 145 can be any desired thickness; however, during formation of the second layer 145 and the protective layer 147, care should be taken to ensure that the binder 134 does not penetrate too far into the first layer 137 such that the low refractive index substantially increases. In some embodiments, the binder 134 can diffuse up to 200 nanometers or more into the first coating layer 131, so the dry coating thickness of the second solution 140 is preferably 250 nanometers or more, so that after diffusion, at least about 50 nanometers of the protective layer 147 remains on the surface 143 of the protected film 202. In some embodiments the protective layer 147 has a thickness in a range greater than about 50 nanometers, and can range from about 50 nanometers to 5000 nanometers, or from about 0.2 micrometers to about 1 micrometers. In some cases, the protective layer can even range from about 1 to 20 micrometers or from 1 to 15 micrometers.

FIGS. 1-2C thus shows a method, comprising: coating the first solution 130 on the substrate 120, the first solution 130 comprising the plurality of metal oxide particles 138, the binder 134, and the solvent 132, wherein the binder 134 has a first concentration in the solvent 132; coating the second solution 140 on the first solution 130, the second solution 140 comprising the binder 134 at a second concentration in the solvent 132, the second concentration different from the first concentration; and removing the solvent 132 from the first solution 130 and the second solution 140 to form a protected film 202, wherein a weight ratio of the binder 134 to the metal oxide particles 138 increases in a thickness direction of the protected film 202.

Figure 3A:
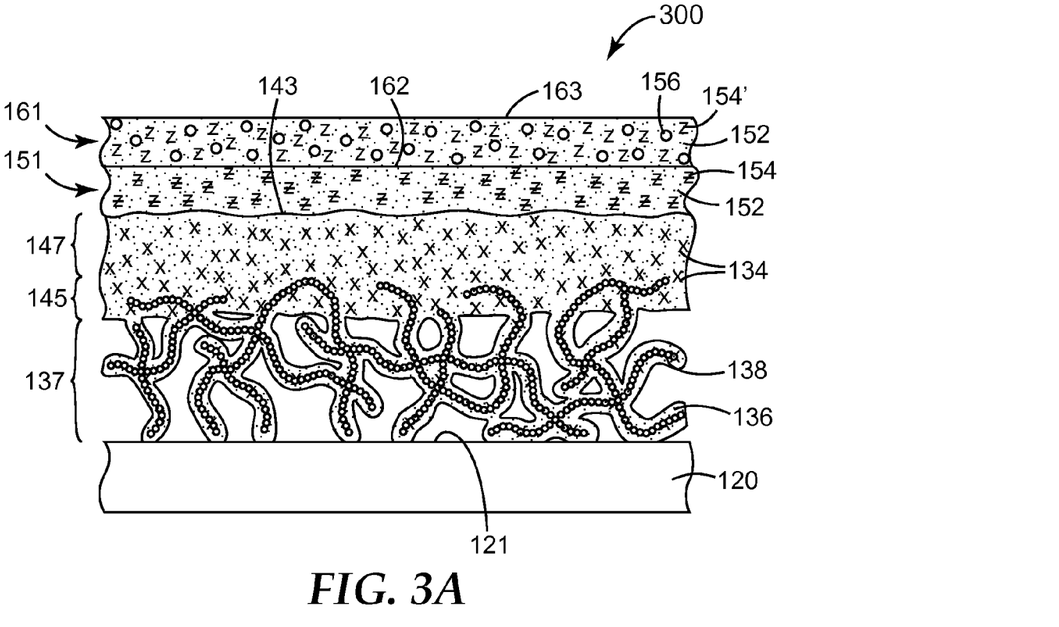
FIG. 3A shows a cross-sectional schematic of a coating on the protected film of FIG. 2C.

FIG. 3A shows a cross-sectional schematic of a coating on the protected film of FIG. 2C, according to one aspect of the disclosure. In FIG. 3A, a fourth solution layer 151 is coated on the surface 143 of protected film 202 described in FIG. 2C. The fourth solution layer 151 includes a second binder 154, and a second solvent 152, wherein the second binder 154 has a fourth concentration in the second solvent 152. A fifth solution layer 161 is coated on the fourth solution layer 151, the fifth solution layer 161 includes a third binder 154' at a fifth concentration in the second solvent 152 and a plurality of diffuser particles 156.

The fourth and fifth solution layers 151, 161, can be coated on the surface 143 of protected film 202 by any acceptable coating technique, and can be coated in the same manner as shown in FIG. 1, that is, using a slide coater. The second binder 154 and the third binder 154' can be the same binder, or they can be different, and can be selected from any of the binders described elsewhere. In some cases, the second binder 154 and the third binder 154' can be the same polymeric binder, but can have different molecular weights, such as a low molecular weight second binder 154, and a higher molecular weight third binder 154'. In one particular embodiment, the second binder 154 can be PVB having a molecular weight less than about 20,000 g/gmol, and the third binder 154' can be PVB having a molecular weight greater than about 20,000 g/gmol. The second solvent 152 can be any suitable solvent for the second and third binder 154, 154', which does not attack or dissolve the binder 134 of the protective layer 147. In one particular embodiment, the first and second binders 154, 154' are PVB, and the second solvent is methyl ethyl ketone (MEK).

The diffuser particles 156 can have any useful diameter such as 0.5 to 10 micrometers or from 2 to 5 micrometers or have an average lateral dimension of about 1 micrometer or greater, for example. The diffusing particles can be beads comprising inorganic materials such as glasses, or polymeric materials such as polystyrene (PS), polymethyl methacrylate (PMMA), silicone, and the like. Typical diffusing PS particles such as Soken KSR 3A and SX 350H are available from Soken Chemical and Engineering Co. Ltd. Sayama-Shi, Saitama-Ken, Japan.

Figure 3B:
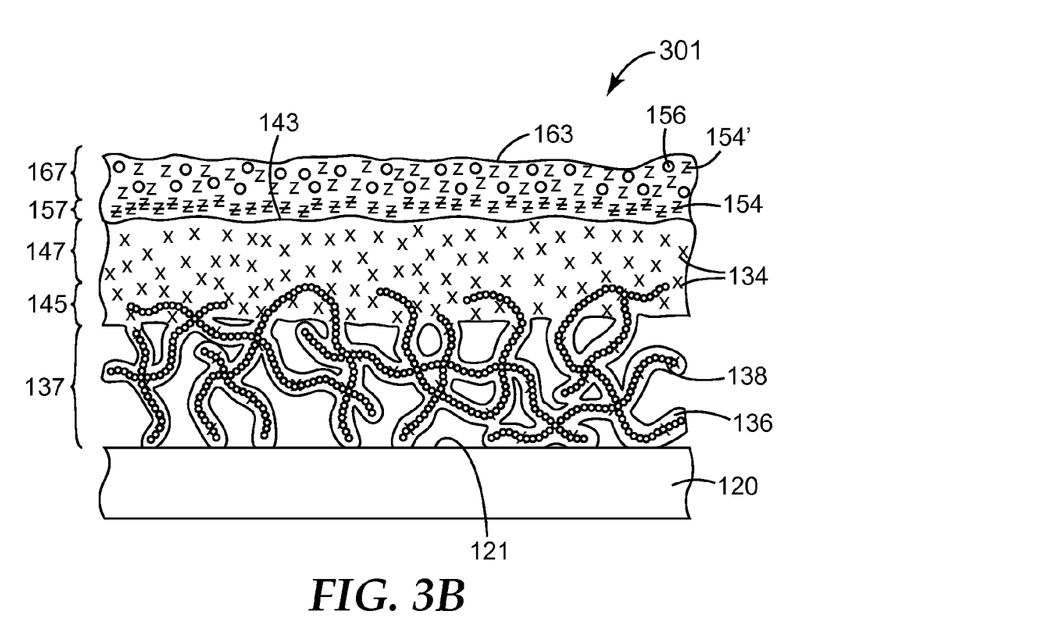
FIG. 3B shows a cross-sectional schematic of the dried construction of FIG. 3A.

FIG. 3B shows a cross-sectional schematic of the dried construction of FIG. 3A, according to one aspect of the disclosure. The second solvent 152 is removed from the fourth solution layer 151 and the fifth solution layer 161 to form a diffusing film 301 shown in FIG. 3B. The diffusing film 301 can have any useful haze value. In many embodiments the diffusing film 301 has a haze value of 20% or greater, 50% or greater, 70% or greater, 75% or greater, or 90% or greater. In some embodiments, a second low refractive index layer (not shown) can be disposed on the diffusing film 301 or on the protected film 202, or between the first layer 137 and the substrate 120, as desired. The second low refractive index layer can have the effective refractive index of 1.3 or less, and can be similar to the low refractive index layer of the first layer 137.

A typical 1:4 (polymer to pigment ratio) fumed silica low index coating at 11% solids can contain 2.2 wt % polyvinyl alcohol (PVA) in solution. If the adjacent seal layer contains PVA with a concentration less than 2.2 wt %, the polyvinyl alcohol polymer will diffuse away from the fumed silica and into the seal layer. The resulting dry film can contain a 1:4 polymer to pigment ratio away from the seal interface, while near the seal layer, a polymer to pigment ratio of 1:7 or more can be expected. On the other hand (and more typically) a seal layer with a PVA concentration that is greater than 2.2% will result in diffusion of PVA from the seal layer into the fumed silica. The resulting dry film may contain an ultralow index coating with a polymer to pigment ratio that is 1:3 or less near the seal surface. Essentially, the diffusion of polymer from one layer into an adjacent layer is driven by the concentration gradient between the two layers. Thus, the system can be designed where the concentration of polymer in the adjacent layer and the low index layer are the same or nearly so, and diffusion between the two layers can be minimized.

The rate of polymer diffusion between two layers is controlled by concentration difference, viscosity, molecular weight, time, and chemical reaction. Diffusion starts once the two layers are in contact until the film is dried or solidified. In practice, the diffusion rate is almost never constant during the drying process, making accurate modeling of the process difficult.

Low index coatings with an adjacent seal layer (or smoothing) layer that diffuses into the low index layer can have the benefit of strengthening the low index coating. We have found that coatings that needed a 1:4 polymer to binder ratio (since using less polymer resulted in cracking) could be substituted with a more desirable (and less hazy) 1:6 polymer to binder ratio if a diffusing polymer layer was adjacent to the low index coating. The end result was a crack free, lower haze, and lower uniformity construction. The diffusing layer could also be on either side (that is, near or far from the coating substrate) and have the same strengthening effect on the construction.

In one particular embodiment, a protected low-index diffuse ESR film can be made that is a four layer construction on ESR film. The first two layers are coated simultaneously using a multi-layer slide coating device. The bottom, or first layer on the ESR, is a polyvinyl alcohol blend with fumed silica at a 1:2 to a 1:8 ratio, preferably at a 1:4 to 1:6 ratio. Water and isopropyl alcohol are added with a surfactant to enable an acceptable coating regime. The first layer is coated at a flow rate so that the final dry thickness is between 0.5 and 15 micron, preferably between 3 and 6 micron. The second layer is coated on top of the first layer. The second layer contains a Polyvinyl Alcohol in a mixture of water, Isopropyl Alcohol, and a surfactant. The second layers rheology is constructed so that it freely wets out the first layer on the slide coater. The second layer is coated at a flow rate so that the final dry thickness is between 0.01 and 10 micron, preferably between 0.25 and 1 micron. The coated layers are then dried in an oven at 180-200F for 2 to 4 minutes.

The ESR with the first two layers is then coated with two additional layers. The top two layers are coated simultaneously using a multi-layer slide coating device. The bottom, or third layer, is a low molecular weight polyvinyl butyral resin dissolved in MEK. The molecular weight is chosen to provide adhesion to layer two. It is preferred to be less than 40,000 grams/mole. The third layer is coated at a flow rate so that the final dry thickness is between 0.1 and 3 microns, preferably between 0.2 and 1 micron. The fourth layer is coated on top of the third layer. The fourth layer contains a polyvinyl butyral dissolved in MEK. The fourth layer rheology is constructed so that it freely wets out the first layer on the slide coater. The fourth layer is coated at a flow rate so that the final dry thickness is between 0.5 and 15 micron, preferably between 4 and 6 micron. The top coated layers are then dried in an oven at 160-180F for 2 to 4 minutes. It should be noted that MEK is the preferred solvent system for the top two layers, but other solvents or combinations can be used as long as the polymers are soluble in them.

EXAMPLES

Unless otherwise specified, the following materials were used in the Examples.

| Poval PVA 235 | polyvinyl alcohol binder | Kuraray America Inc., Houston TX |
|---|---|---|
| Cab-O-Sperse ™ PG-002 | aqueous fumed silica dispersion | Cabot Corporation, Boston MA |
| Cab-O-Sperse ™ PG-022 | aqueous fumed silica dispersion | Cabot Corporation, Boston MA |
| Citric Acid | pH adjustment | Aldrich |
| Boric Acid | PVA crosslinker | Aldrich |
| Tergitol Minfoam | Non-ionic surfactant | Dow Chemical, Midland MI |
| Isopropyl Alcohol (IPA) | solvent | Aldrich |
| BYK 345 | Silicone surfactant | BYK USA Inc, Wallingford, CT |
| Methyl Ethyl Ketone (MEK) | solvent | Aldrich |
| Mowitol B20H | Polyvinyl butyral (PVB) resin binder | Kuraray America Inc., Houston TX |
| Soken PS (SX-350H) beads | 3.5µ Polystyrene beads | Soken Chem & Eng Ltd., JP |
| Solutia Butvar B76 | Polyvinyl butyral (PVB) resin binder | Solutia Inc., Indian Orchard MA |

In each solution preparation, the PVA was added to the water, and kept at a temperature of 90 C while stirring, until the PVA went into solution. Then the mixture was cooled and the remaining ingredients added. The final mixture was subjected to high-shear mixing using a Cowles mixer to uniformly disperse the components.

For example, in a typical compounding procedure, a low refractive index coating solution was produced by first blending in a drum 42.9 kg of a 6.2% solids aqueous solution of Poval 235 polyvinyl alcohol (PVA) (Poval 235 resin available from Kuraray, USA) with 79.8 kg Cab-O-Sperse PG022 fumed silica dispersion (available from Cabot Corporation, USA). This mixture was then dispersed for 20-30 minutes using a Cowles mixer. Low shear mixing was used for the rest of the procedure. 0.145 kg citric acid (available from Sigma-Aldrich, Milwaukee, Wis.), pre-dissolved in 1.301 kg water, was added to the mixture with continued mixing. The mixture was further let down for coating by adding a pre-blend of 59.8 kg deionized water and 30.6 kg isopropyl alcohol. A pre-mix of 0.113 kg Tergiol Minfoam1X (available from Dow Chemical, Midland, Mich.) in 1.02 kg deionized water was added next with continued mixing. Finally, a solution of 0.384 kg boric acid (available from Sigma-Aldrich, Milwaukee, Wis.) in 10.592 kg deionized water was added slowly to the batch with mixing. The final mixture was 8.5% solids with a ratio of PVA:Fumed Silica of 1:6.

Example 1

Protected Low-Index Diffuse Film on ESR

A four layer coating was prepared on Vikuiti™ ESR film, available from 3M Company. The first two layers were coated simultaneously using a multi-layer slide coating die. The bottom, or first layer on the ESR, was a 9% solids by weight (2% PVA solution) low index coating solution prepared by mixing 1.25 wt % Poval PVA 235, 37.5 wt % Cab-O-Sperse™ PG-022, 0.07 wt % citric acid, 0.18 wt % boric acid, 0.025 wt % Tergitol Minfoam, 16 wt % isopropyl alcohol, and 44.975 wt % water. The second layer was a 4.2% solids by weight (4.2% PVA solution) protective layer prepared by mixing 4.14 wt % Poval PVA 235, 0.04 wt % citric acid, 0.025 wt % BYK 345, 25 wt % isopropyl alcohol, and 70.795 wt % water. The second layer was prepared so that it freely wet out the first layer on the slide coater.

A slide coater was positioned at a gap of 0.008 inches from an ESR web moving at 100 ft/min (30.48 m/min). The first layer was pumped at 400 g/min to a slide coater having a first slot thickness of 0.008 inches (0.203 mm), a step height of 0.010 inches (0.254 mm) and a 13 in (33 cm) width, and the second layer was pumped at 180 g/min to the slide coater having a second slot thickness of 0.029 inches (0.737 mm), a step height of 0.020 inches (0.508 mm) and a 13 in (33 cm) width. The coated layers were then dried in a two zone oven. The first zone was 70 ft (21.3 meters) long and held at 75 C, and the second zone was also 70 ft (21.3 meters) long and held at 90 C, and resulted in a protected low-index film on ESR.

The second two layers were coated simultaneously on top of the protected low-index film on ESR, also using a multi-layer slide coating die. The bottom, or third layer, was a 6% solids by weight carrier coating solution prepared by mixing 6 wt % Mowital B20H PVB and 94 wt % MEK. The fourth layer was a 17.5% solids by weight diffuse layer prepared by mixing 12.25 wt % Solutia B76 PVB, 5.25 wt % Soken PS beads, and 82.5 wt % MEK. The second layer was prepared so that it freely wet out the first layer on the slide coater.

A slide coater was positioned at a gap of 0.008 inches (0.203 mm) from the protected low-index film on ESR web moving at 100 ft/min (30.48 m/min). The third layer was pumped at 40 g/min to a slide coater having a first slot thickness of 0.008 inches (0.203 mm), a step height of 0.010 inches (0.254 mm) and a 12.5 in (31.8 cm) width, and the second layer was pumped at 320 g/min to the slide coater having a second slot thickness of 0.029 inches (0.737 mm), a step height of 0.020 inches (0.508 mm) and a 12.5 in (31.8 cm) width. The coated layers were then dried in a two zone oven. The first zone was 70 ft (21.3 meters) long and held at 55 C, and the second zone was also 70 ft (21.3 meters) long and held at 75 C, and resulted in a protected low-index diffuse film on ESR.

A further series of examples were prepared according to the procedures described above for the first two layers of the four layer coating of Example 1. The solutions used were identical to those described above, except that in several examples, a different fumed silica (Cab-O-Sperse™ PG-002) was substituted for Cab-O-Sperse™ PG-022. The examples shown below used several different ratios of fumed silica to binder, different coating thicknesses, two different fumed silicas, two different substrates and different coating conditions as described in Table 1. The two substrates used were 0.002 inch (0.051 mm) thick polyethylene terephthalate (PET) and Vicuiti™ ESR film).

The refractive index (RI) of the constructions was measured determined by use of the prism coupling method using the Metricon 2010M Prism Coupler available from Metricon Corp. of Pennington, N.J. The RI (n) was determined at 633 nm. Accurate determination of the refractive index of the higher haze coatings was best determined by measuring the refractive index in the TM polarization state through the substrate side of the coated film. In this process, the prism and the substrate side of the coatings were coupled and the RI measurement was scanned between n=1.55 to 1.05. This method results in the detection of two critical angle transitions; one associated with the substrate-prism interface at n=~1.495 and another associated with the substrate-low index coating interface. The Metricon raw data were analyzed to determine the critical angle of this second transition by use of a 200 point smoothing analysis program of the regions above and below the inflection point of this second critical angle. Two linear regions were determined from the smoothed data and the intersection of these two lines corresponded to the inflection point of the curve and thus the RI of low refractive index coating.

TABLE 1

Protected Low Index Coating Examples

| Example Number | Substrate | Fumed Silica Type | Silica To Binder Ratio | Low Index Thickness, microns | PVA Seal Thickness, microns | RI | Coating and Drying (notes) |
|---|---|---|---|---|---|---|---|
| T1 | PET | PG-022 | 6 | 8 | 0 | 1.181 | — |
| T2 | PET | PG-022 | 6 | 10 | 0 | 1.178 | — |
| J1 | ESR | PG-022 | 6 | 10 | 0 | 1.182 | — |
| T3 | PET | PG-022 | 6 | 10 | 0.75 | 1.190 | — |
| T4 | PET | PG-022 | 6 | 7 | 0.75 | 1.190 | — |
| T5 | PET | PG-022 | 6 | 4 | 0.75 | 1.200 | — |
| T6 | PET | PG-002 | 5 | 12.5 | 0 | 1.177 | — |
| T7 | PET | PG-002 | 5 | 12.5 | 0.75 | 1.190 | — |
| T8 | PET | PG-002 | 5 | 10 | 0 | 1.173 | — |
| T9 | PET | PG-002 | 5 | 10 | 0.75 | 1.198 | — |
| T12 | PET | PG-002 | 5 | 8 | 0.75 | 1.197 | — |
| J13c | ESR | PG-002 | 5 | 8 | 0.5 | 1.182 | — |
| J14d | ESR | PG-002 | 5 | 10 | 0.5 | 1.190 | — |
| J15c | ESR | PG-002 | 5 | 6 | 0.75 | 1.196 | — |
| T2a | PET | PG-022 | 6 | 10 | 0 | 1.183 | A |
| T9a | PET | PG-022 | 6 | 5.0 | 0.75 | 1.187 | A |
| T10a | PET | PG-022 | 6 | 2.3 | 0.00 | 1.196 | A |
| T11a | PET | PG-022 | 6 | 3.0 | 0.50 | 1.211 | A |
| T12a | PET | PG-022 | 6 | 2.0 | 0.50 | 1.226 | A |
| T13a | PET | PG-022 | 6 | 1.0 | 0.50 | 1.239 | A |
| T14a | PET | PG-022 | 6 | 5 | 0.75 | 1.190 | A |
| T15a | PET | PG-022 | 7 | 2.3 | 0.00 | 1.235 | A |
| T16a | PET | PG-022 | 7 | 3.0 | 0.50 | 1.23 | A |
| T17a | PET | PG-022 | 7 | 2.5 | 0.50 | 1.23 | A |
| T18a | PET | PG-022 | 7 | 2.0 | 0.50 | 1.239 | A |
| T27a | PET | PG-002 | 6 | 8 | 0 | 1.158 | A |
| T28a | PET | PG-002 | 6 | 5 | 0.75 | 1.17 | A |
| T1b | PET | PG-022 | 5.2 | 4.8 | 0 | 1.194 | A, B |
| T2b | PET | PG-002 | 5.2 | 4.8 | 0.8 | 1.203 | A, B |
| T3b | PET | PG-002 | 5.2 | 4.1 | 0.7 | 1.181 | A, B |
| J6 | ESR | PG-022 | 5.2 | 5 | 0.7 | 1.195 | A, B |
| J7 | ESR | PG-002 | 5.2 | 5 | 0.7 | 1.194 | A, B |

Notes on Table 1:
All coating was done using a slide coater under the following conditions:
The low index coating gap and step height was 0.010 inches (0.254 mm); the PVA seal coating gap and step height was 0.020 inches (0.508 mm); the slide coater gap was 0.008 inches (0.203 mm); the vacuum between the slide coater and the substrate was 0.5 inches of water; and the substrate was coated at a speed of 60 ft/min (18.3 m/min).
The coated layers were then dried in a two zone oven. The first zone was 60 ft (18.3 meters) long and held at 165 F. (74 C.), and the second zone was 80 ft (24.4 meters) long and held at 190 F. (88 C.).
The exceptions to the above as noted in the table were: (A) vacuum increased to 1.0 inches of water, and speed increased to 75 ft/min (22.9 m/min); and (B) PVA seal coating gap increased to 0.030 inches (0.762 mm).

Following are a list of embodiments of the present disclosure.

Item 1 is a method, comprising: coating a first solution on a substrate, the first solution comprising a plurality of metal oxide particles, a binder, and a solvent, wherein the binder has a first concentration in the solvent; coating a second solution on the first solution, the second solution comprising the binder at a second concentration in the solvent, the second concentration different from the first concentration; and removing the solvent from the first solution and the second solution to form a protected film, wherein a weight ratio of the binder to the metal oxide particles increases in a thickness direction of the protected film.

Item 2 is the method of item 1, wherein coating the first solution and the second solution occurs simultaneously using a slide coater, a multilayer slot coater, or a combination thereof.

Item 3 is the method of item 1 or item 2, wherein coating the first solution and the second solution occurs sequentially using a curtain coater.

Item 4 is the method of item 1 to item 3, wherein removing the solvent comprises drying the first and second solutions in a gap drier, an impingement drier, a flotation drier, a quiescent drier, or a combination thereof.

Item 5 is the method of item 1 to item 4, wherein removing the solvent comprises diffusion of the binder across an interface formed between the first solution and second solution.

Item 6 is the method of item 1 to item 5, wherein the first concentration is lower than the second concentration.

Item 7 is the method of item 1 to item 6, wherein the weight ratio of the binder to the metal oxide particles increases from less than 1:2 proximate the substrate to greater than 1:1 proximate an exterior surface of the protected film.

Item 8 is the method of item 1 to item 7, wherein the substrate comprises a third solution coated thereupon, the third solution comprising a second plurality of metal oxide particles, the binder, and the solvent, wherein the binder has a third concentration in the solvent, and the first solution is coated on the third solution.

Item 9 is the method of item 8, wherein the plurality of metal oxide particles and the second plurality of metal oxide particles comprise identical particles.

Item 10 is the method of item 8 to item 9, wherein the third concentration is lower than the first concentration.

Item 11 is the method of item 1 to item 10, further comprising diffuser particles dispersed in at least one of the first solution or the second solution.

Item 12 is the method of item 8 to item 11, further comprising diffuser particles dispersed in the third solution.

Item 13 is the method of item 1 to item 12, wherein the binder comprises polyvinyl alcohol (PVA), polyvinyl butyral (PVB), polyvinyl pyrrolidone, polyvinyl acetate, vinyl acetate/ethylene copolymers, polyethylene oxide, polypropylene oxide, or a combination thereof.

Item 14 is the method of item 1 to item 13, wherein the solvent comprises water, isopropyl alcohol, methyl ethyl ketone, or a combination thereof.

Item 15 is the method of item 1 to item 14, wherein the binder comprises PVA.

Item 16 is the method of item 1 to item 15, further comprising: coating a fourth solution on the protected film, the fourth solution comprising a second binder, and a second solvent, wherein the second binder has a fourth concentration in the second solvent; coating a fifth solution on the fourth solution, the fifth solution comprising a third binder at a fifth concentration in the second solvent and a plurality of diffuser particles; and removing the solvent from the fourth solution and the fifth solution to form a diffusing film.

Item 17 is the method of item 16, wherein the second binder and the third binder are each selected independently from polymers comprising polyvinyl alcohol (PVA), polyvinyl butyral (PVB), polyvinyl pyrrolidone, polyvinyl acetate, vinyl acetate/ethylene copolymers, polyethylene oxide, polypropylene oxide, or a combination thereof.

Item 18 is the method of item 16 to item 17, wherein the second solvent comprises water, isopropyl alcohol, methyl ethyl ketone, or a combination thereof.

Item 19 is the method of item 16 to item 18, wherein the diffuser particles comprise beads having a diameter between about 0.5 microns and about 10 microns.

Item 20 is the method of item 16 to item 19, wherein the second binder molecular weight is smaller than the third binder molecular weight.

Item 21 is the method of item 16 to item 20, wherein the second binder and the third binder each comprise PVB.

Item 22 is the method of item 1 to item 21, wherein the substrate comprises an optical film.

Item 23 is the method of item 1 to item 22, wherein the optical film comprises ESR film.

Item 24 is an article, comprising: a substrate; a first layer disposed on a major surface of the substrate, the first layer comprising metal oxide particles dispersed in a binder, and a plurality of voids; a second layer disposed on the first layer, the second layer comprising metal oxide particles dispersed in the binder, absent a plurality of voids; and a protective layer disposed on the second layer, the protective layer comprising the binder, absent metal oxide particles and absent the plurality of voids.

Item 25 is the article of item 24, wherein a weight ratio of the binder to the metal oxide particles in the first layer is 1:2 or less.

Item 26 is the article of item 24 to item 25, wherein a weight ratio of the binder to the metal oxide particles in the second layer is greater than about 1:2.

Item 27 is the article of item 24 to item 26, further comprising a third layer disposed between the substrate and the first layer, the third layer comprising second metal oxide particles dispersed in the binder, and a second plurality of voids.

Item 28 is the article of item 24 to item 27, wherein the second metal oxide particles and the metal oxide particles comprise identical particles.

Item 29 is the article of item 24 to item 28, further comprising diffuser particles dispersed in at least one of the first layer, the second layer, or the protective layer.

Item 30 is the article of item 24 to item 29, further comprising diffuser particles dispersed in the third layer.

Item 31 is the article of item 24 to item 30, wherein the binder comprises polyvinyl alcohol (PVA), polyvinyl butyral (PVB), polyvinyl pyrrolidone, polyvinyl acetate, vinyl acetate/ethylene copolymers, polyethylene oxide, polypropylene oxide, or a combination thereof.

Item 32 is the article of item 24 to item 31, wherein the first layer has an effective refractive index of 1.3 or less.

Item 33 is the article of item 24 to item 32, further comprising: a third layer disposed on the protective layer, the third layer comprising a second binder; and a fourth layer disposed on the third layer, the fourth layer comprising a plurality of diffuser particles and a third binder.

Item 34 is the article of item 33, wherein the second binder and the third binder are each selected independently from polymers comprising polyvinyl alcohol (PVA), polyvinyl butyral (PVB), polyvinyl pyrrolidone, polyvinyl acetate, vinyl acetate/ethylene copolymers, polyethylene oxide, polypropylene oxide, or a combination thereof.

Item 35 is the article of item 33 to item 34, wherein the diffuser particles comprise beads having a diameter between about 0.5 microns and about 10 microns.

Item 36 is the article of item 33 to item 35, wherein the second binder molecular weight is smaller than the third binder molecular weight.

Item 37 is the article of item 33 to item 36, wherein the second binder and the third binder each comprise PVB.

Item 38 is the article of item 24 to item 37, wherein the substrate comprises an optical film.

Item 39 is the article of item 38, wherein the optical film comprises ESR film.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A method, comprising:
   coating a first solution on a major surface of an optical element, the first solution comprising a plurality of fumed metal oxide particles, a binder, and a solvent, wherein the binder has a first concentration in the solvent;
   coating a second solution on the first solution, the second solution comprising the binder at a second concentration in the solvent, the second concentration different from the first concentration; and
   removing the solvent from the first solution and the second solution to form a protected film, wherein the protected film comprises:
   a low refractive index layer disposed on the major surface of the optical element, wherein the low refractive index layer comprises a plurality of interconnected voids and an effective refractive index of 1.3 or less, and
   a polymeric protective layer on the low refractive index layer, and wherein a weight ratio of the binder to the metal oxide particles increases in a thickness direction of the protected film.

2. The method of claim 1, wherein coating the first solution and the second solution occurs simultaneously using a slide coater, a multilayer slot coater, or a combination thereof.

3. The method of claim 1, wherein coating the first solution and the second solution occurs sequentially using a curtain coater.

4. The method of claim 1, wherein the first concentration is lower than the second concentration.

5. The method of claim 1, wherein the weight ratio of the binder to the metal oxide particles increases from less than 1:2 proximate the substrate to greater than 1:1 proximate an exterior surface of the protected film.

6. The method of claim 1, wherein the substrate comprises a third solution coated thereupon, the third solution comprising a second plurality of metal oxide particles, the binder, and the solvent, wherein the binder has a third concentration in the solvent, and the first solution is coated on the third solution.

7. The method of claim 6, wherein the third concentration is lower than the first concentration.

8. The method of claim 1, further comprising diffuser particles dispersed in at least one of the first solution or the second solution.

9. The method of claim 1, further comprising:
   coating a fourth solution on the protected film, the fourth solution comprising a second binder, and a second solvent, wherein the second binder has a fourth concentration in the second solvent;
   coating a fifth solution on the fourth solution, the fifth solution comprising a third binder at a fifth concentration in the second solvent and a plurality of diffuser particles; and
   removing the solvent from the fourth solution and the fifth solution to form a diffusing film.

10. The method of claim 9, wherein the second binder and the third binder are each selected independently from polymers comprising polyvinyl alcohol (PVA), polyvinyl butyral (PVB), polyvinyl pyrrolidone, polyvinyl acetate, vinyl acetate/ethylene copolymers, polyethylene oxide, polypropylene oxide, or a combination thereof.

11. The method of claim 9, wherein the diffuser particles comprise beads having a diameter between about 0.5 microns and about 10 microns.

* * * * *